US006068733A

United States Patent [19]

Storbeck et al.

[11] Patent Number: 6,068,733

[45] Date of Patent: May 30, 2000

[54] RECORDING MATERIAL FOR THE INK JET PRINTING PROCESS

[75] Inventors: Wolfgang Storbeck, Bissendorf; Gerhard Dransmann, Osnabrück, both of Germany

[73] Assignee: Felix Schoeller Jr. Foto-und Spezialpapiere GmbH & Co. KG, Osnabruck, Germany

[21] Appl. No.: 09/217,720

[22] Filed: Dec. 21, 1998

Related U.S. Application Data

[63] Continuation of application No. 08/781,575, Jan. 9, 1997, abandoned.

[30] Foreign Application Priority Data

Jan. 26, 1996 [DE] Germany ........................... 196 02 793

[51] Int. Cl.[7] .................................................. B32B 9/00

[52] U.S. Cl. .......................... 162/135; 162/141; 162/149; 428/195; 428/211

[58] Field of Search .................................... 162/135, 141, 162/149; 428/195, 211

[56] References Cited

U.S. PATENT DOCUMENTS

| | | | |
|---|---|---|---|
| 5,320,897 | 6/1994 | Kondo et al. . | |
| 5,405,678 | 4/1995 | Bilodeau | 428/211 |
| 5,843,572 | 12/1998 | Yasuda et al. | 428/342 |

FOREIGN PATENT DOCUMENTS

| | | |
|---|---|---|
| 423829 | 4/1991 | European Pat. Off. . |
| 2210812 | 6/1989 | United Kingdom . |

*Primary Examiner*—James Derrington
*Attorney, Agent, or Firm*—Norris, McLaughlin & Marcus, P.A.

[57] ABSTRACT

A recording material for the ink jet printing process, comprising a paper support and an ink absorbing layer containing a pigment and a binding agent characterised in that the paper contains a mixture of softwood sulphate and eucalyptus cellulose, and has a wet stretch in the transverse direction<3.0%, a tearing length ratio longitudinal/transverse<2, a stiffness ratio longitudinal/transverse<2 and a density<0.8 g/cm$^3$.

10 Claims, No Drawings

RECORDING MATERIAL FOR THE INK JET PRINTING PROCESS

This is a continuation application of application Ser. No. 08/781,575, filed on Jan. 9, 1997, now abandoned.

The invention relates to a recording material for the ink jet printing process.

The ink jet printing process is one of the electronic printing processes. In that case it is possible for images, texts and graphics to be put together on the computer and printed out directly as a display screen hard copy.

In the ink jet printing process droplets of a recording fluid are applied to the surface of the carrier material by means of different procedures. Droplet generation basically involves two alternative operating procedures. In the method of continuous droplet generation, a constant droplet stream is expelled from the nozzle under high pressure. The droplets which are not required for making up the image are fed to the ink reservoir again, on the basis of various principles.

In the case of the drop on-demand method, an ink droplet is generated on demand only at the locations at which the image is to be produced. By means of a digital electronic control system, as in the case of the Hertz process, it is possible to produce images with a very high degree of resolution directly from electronic data.

The ink jet recording process is used for the production of colour graphics, full-colour copies and also for text printing and it therefore covers a very wide field of use. Different requirements are made in regard to the recording material, such as:

dot size
light fastness
colour bleed
water-fastness
density
dimensional stability.

The receiving material comprises a support material, an ink receiving layer and possibly auxiliary layers. Both the support material and the ink receiving layer must be matched to each other, to resolve those problems.

Ink jet printers for producing photograph-like prints use inks with a high proportion of water as a solvent. In addition the application of ink of such printers is greater than in the case of the conventional ink jet printers. The receiving materials used were initially foils as they are distinguished by a high level of dimensional stability when wetted with water. When using conventional ink jet papers waviness in the transverse direction (print cockle) occurs due to the high water content which penetrates through the ink receiving layer into the paper basis. That waviness results in contact with the print head and results in the print image being adversely affected. In addition contact with the head can result in damage to the receiving material.

For the production of photograph-like ink jet prints, it is therefore necessary to use a receiving material in which the paper core has a high level of dimensional stability and is thus capable of absorbing a large amount of water and the receiving layer satisfies the specified requirements in terms of image and text quality.

Laid-open application GB 2 210 812 describes a receiving material comprising a paper basis and an ink absorbing layer. The paper contains calcium carbonate as the pigment, with high levels of requirement being made in regard to the paper sizing. A Fourdrinier paper machine is proposed for producing the basis. The ink absorbing layer comprises calcium carbonate and a binding agent of cationic vinyl acetate copolymer and a polyvinyl alcohol with silanol groups. The receiving material is distinguished by good water-fastness and image sharpness.

A disadvantage however is the occurrence of waviness with a high degree of water absorption and a reduction in colour density at higher coating weights.

Japanese laid-open application JP 06262845 describes a receiving material comprising a paper support and an ink absorbing layer. The paper support contains leaf wood cellulose and a sizing comprising starch and alkyl ketene dimer. A disadvantage in this case also is the occurrence of a waviness of the support material due to the sole use of short-fibre cellulose.

The object of the present invention is to provide a recording material for the ink jet printing process, which material is distinguished by:

high colour density
good water-fastness
a low degree of bleed
image sharpness
dimensional stability.

That object is attained by a recording material which comprises a paper support and a layer containing pigment and a binding agent, wherein the paper comprises a mixture of softwood sulphate and eucalyptus cellulose, and has a wet stretch in the transverse direction<3.0%, a tearing length ratio longitudinal/transverse<2, a stiffness ratio longitudinal/transverse<2 and a density<0.8 g/cm$^3$.

The paper support according to the invention can be produced on the machines which are conventional in the paper industry, in particular on a Yankee paper machine.

In a preferred form the softwood sulphate cellulose is pinewood sulphate cellulose.

The proportion of softwood sulphate cellulose is between 5% and 80%, in particular between 10% and 40% of the total cellulose. This composition has been found to be advantageous in order to achieve a high degree of dimensional stability. To increase whiteness and opacity, it is possible to add inorganic pigments such as calcium carbonate, clay, titanium dioxide and silicates. The orientation of the fibres in the longitudinal and. transverse directions Must be so selected that there is a ratio longitudinal/transverse<2.0 in regard to tearing length and stiffness. All compounds which are usual in the paper industry can be used as the sizing and wet strength agent. The paper can be both acid and also neutral sized.

Wet stretch transversely in accordance with Fenchel must be<3.0%, in a preferred embodiment<2.0%.

The density of the paper must be<0.8 g/cm$^3$, in a preferred form<0.7 g/cm$^3$.

The basis weight of the paper according to the invention is between 60 g/m$^2$ and 220 g/m$^2$. In a preferred embodiment the basis weight is between 80 g/m$^2$ and 160 g/m$^2$.

The receiving layer of the receiving material according to the invention contains as the pigment silica or a mixture of silica acid with other pigments such as aluminium oxide, calcium carbonate, magnesium carbonate, titanium dioxide and silica gel.

The binding agent used is a mixture of a polyvinyl alcohol with silanol groups, a cationic polyvinyl alcohol, a cationic polyacrylate, a boronated polyvinyl alcohol and a cationic polymer based on acrylic acid ester.

That binding agent mixture provides for a high degree of water-fastness, high colour densities and good light stability. Bleeding-out of the colours at the edges of colour surfaces when using mixed colours with a magenta component is avoided.

Further constituents of the ink absorbing layer may be dyestuff-fixing agents such as poly-dadmac (polydiallyldimethylammonium chloride), dyestuffs, optical brighteners and alcohols.

The proportion of the cationic polyvinyl alcohol in the ink absorbing layer can be between 5% by wt and 20% by wt, in particular between 10% by wt and 15% by wt, with respect to the dried layer. The proportion of the polyvinyl alcohol with silanol groups in the ink absorbing layer can be between 5% by wt and 20% by wt, in particular between 10% by wt and 15% by wt, with respect to the dried layer.

The proportion of polyvinyl alcohol with boric acid (boronated polyvinyl alcohol) in the ink absorbing layer can be between 5% by wt and 20% by wt, in particular 10% by wt and 15% by wt, with respect to the dried layer. The proportion of the cationic polyacrylate in the ink absorbing layer can be between 2% by wt and 20% by wt, in particular between 5% by wt and 10% by wt, with respect to the dried layer. The proportion of pigment or pigment mixture in the ink absorbing layer can be between 30% by wt and 70% by wt, in particular between 50% by wt and 60% by wt, with respect to the dried layer.

The coating weight of the ink absorbing layer is between 2 g/m$^2$ and 16 g/m$^2$, in particular between 4 g/m$^2$ and 12 g/m$^2$.

The following Examples are intended to describe the invention in greater detail.

The paper support according to the invention was produced as follows:

Softwood sulphate cellulose 250.0 kg

Eucalyptus cellulose 1250.0 kg

Water 14 m$^3$

Filler 408.6 kg

Cationic starch 12 kg by means of metering pumps sizing and wet strength agents were continuously added to the fluid substance:

Sizing agent 300.0 ml/min.

Wet strength agent 4.0% 1600.0 ml/min.

Papers with different basis weights were produced using that composition, as follows:

Paper 1 80 g/m$^2$

Paper 2 100 g/m$^2$

Paper 3 120 g/m$^2$.

The following tests were conducted on those papers:

1. wet stretch transversely in accordance with Fenchel
2. tensile strength in accordance with DIN 53112, longitudinal/transverse ratio
3. stiffness in accordance with DIN 53121, longitudinal/transverse ratio
4. smoothness in accordance with Bekk Results of the paper test operations:

TABLE 1

| Test Type | 1 | 2 | 3 |
|---|---|---|---|
| Wet stretch | 1.87 | 2.04 | 1.95 |
| Tensile strength | 1.82 | 1.89 | 1.80 |
| Flexural stiffness | 1.88 | 1.93 | 1.77 |
| Smoothness | 126 | 210 | 110 |
| Density | 0.75 | 0.69 | 0.65 |

TABLE 2

| Composition | a | b | c | d |
|---|---|---|---|---|
| Amorphous silicon dioxide 18%, Gasil$^R$ HP 39 Omya GmbH | 20.00 | 25.00 | 28.00 | 35.00 |
| Amorphous silicon dioxide 18%, Gasil$^R$ HP250, Omya GmbH | 20.00 | 25.00 | 28.00 | 35.00 |
| Polydadmac 40%, Praestol$^{R}$*) | 4.00 | 4.00 | 4.00 | 4.00 |
| Cationic acrylate 20%, Induquat$^R$ ECR 69L, Indulor | 7.00 | 14.00 | 8.00 | 7.00 |
| Cationic acrylic acid ester 20%, Basoplast$^R$ 258D, BASF | 15.00 | 10.00 | 10.00 | 8.00 |
| Polyvinyl alcohol with boric acid 10%, Moviol$^R$ 35–99 Hoechst AG | 15.00 | 15.00 | | |
| Cationic polyvinyl alcohol 20%, C-506 C Polymer$^R$, Kuraray Co | 19.00 | 7.00 | 8.00 | 5.00 |
| Polyvinyl alcohol with silanol groups 8%, R-1130 R Polymer$^R$, Kuraray Co | | | 14.00 | 6.00 |
| Application g/m$^2$ | 7.20 | 9.40 | 8.80 | 10.30 |

In all cases water was used as the solvent.

All amounts in % by wt are related to the dry layer.

*) Polydiallydimethylammoniumchloride

The paper 1 produced, in accordance with the invention, was coated with the coating materials (a) to (d) produced in accordance with the invention (Examples 1a, 1b, 1c, 1d).

Paper 2 produced, in accordance with the invention, was coated with the coating material (a) produced in accordance with the invention (Example 2a).

Paper 3 produced, in accordance with the invention, was coated with the coating material (d) produced in accordance with the invention (Example 3d).

COMPARATIVE EXAMPLE V1

Comparative Example V1 was a paper support with a basis weight of 100 g/m$^2$ with a proportion of softwood sulphate cellulose of 31% and a eucalyptus cellulose proportion of 69%. The filler proportion was 25% by wt. The paper was sized neutral, the following test values were obtained:

density 0.95 g/cm$^3$ wet stretch 3.9% stiffness l/t 2.4 tensile strength l/t 2.3 smoothness according to Bekk 90 seconds.

That paper support was provided with an ink absorbing layer which as a binding agent contained a mixture of a vinyl acetate, butyl acrylate, versatic acid copolymer and a polyvinyl alcohol. A silica was used as the pigment. Further additives were anti-foam agents, dyestuffs and ink fixing additives.

COMPARATIVE EXAMPLE V2

Comparative Example V2 was a commercially available paper from Hoffmann and Engelmann Type HRC 600/1.

COMPARATIVE EXAMPLE V3

A paper support and an ink absorbing layer were produced in accordance with Example 6 of laid-open application GB 2 210 812.

Testing of the paper produced in accordance with Example B 1a to B 3d and Comparative Examples V1, V2 and V3.

1. Colour Density and 50 Density

Colour density was measured with a Gretag densitometer type 186D in relation to the colours cyan, magenta, yellow and black.

The colours cyan, magenta, yellow and black are printed by means of a computer program in a calculated reference or target density. The actual density was measured with a Gretag densitometer type 186D.

2. Water-Fastness

The printed papers were laid in water at a temperature of 25° C. for 1 minute and dried. Colour density was measured before and after the watering operation. The colour density which has remained is specified in percent.

3. Bleed

Running of the inks into each other at the edges of adjoining colour surfaces was evaluated visually with marks 1 to 6 (very good to very bad).

4. Field Distance

The field distance is the distance between two colour surfaces and should be 1 mm. The actual distance is determined with a microscope with a measuring device. The field distance is a measurement in respect of image sharpness or dot spacing.

5. Dimensional Stability

To determine dimensional stability the paper to be tested is laid on a flat support. The flat positioning of the paper is evaluated with marks 1 to 12 (very good to very poor).

Results of the tests on the Examples

Colour density

| Receiving material | Cyan | Magenta | Yellow | Black |
|---|---|---|---|---|
| B 1a | 2.19 | 1.22 | 1.63 | 2.21 |
| B 1b | 2.15 | 1.22 | 1.58 | 2.19 |
| B 1c | 2.14 | 1.22 | 1.59 | 2.16 |
| B 1d | 2.14 | 1.22 | 1.62 | 2.25 |
| B 2a | 2.17 | 1.22 | 1.61 | 2.20 |
| B 3d | 2.13 | 1.24 | 1.63 | 2.24 |

50% density

| Receiving material | Cyan | Magenta | Yellow | Black |
|---|---|---|---|---|
| B 1a | 0.86 | 0.46 | 0.69 | 0.98 |
| B 1b | 0.92 | 0.47 | 0.69 | 0.99 |
| B 1c | 0.90 | 0.46 | 0.67 | 0.94 |
| B 1d | 0.92 | 0.46 | 0.70 | 1.01 |
| B 2a | 0.90 | 0.45 | 0.68 | 0.99 |
| B 3d | 0.88 | 0.47 | 0.71 | 0.94 |

Water-fastness in percent

| Receiving material | Cyan | Magenta | Yellow | Black |
|---|---|---|---|---|
| B 1a | 98.6 | 81.1 | 98.2 | 98.1 |
| B 1b | 102.3 | 81.1 | 95.5 | 99.1 |
| B 1c | 99.5 | 81.9 | 98.1 | 97.2 |
| B 1d | 97.3 | 84.4 | 98.1 | 97.7 |
| B 2a | 98.5 | 83.3 | 97.1 | 98.5 |
| B 3d | 99.4 | 82.1 | 97.5 | 97.8 |

Field distance, bleed, dimensional stability

| Receiving material | Field distance | Bleed | Waviness |
|---|---|---|---|
| B 1a | 0.90 | mark 2 | mark 2 |
| B 1b | 0.85 | mark 2 | mark 2 |

-continued

Results of the tests on the Examples

| | | | |
|---|---|---|---|
| B 1c | 0.90 | mark 2 | mark 2 |
| B 1d | 0.90 | mark 2 | mark 2 |
| B 2a | 0.85 | mark 2 | mark 2 |
| B 3d | 0.90 | mark 2 | mark 1 |

| Test | V1 | V2 | V3 |
|---|---|---|---|
| Colour density | | | |
| Cyan | 1.99 | 2.20 | 2.11 |
| Magenta | 1.00 | 1.10 | 1.12 |
| Yellow | 1.42 | 1.63 | 1.61 |
| Black | 1.79 | 2.18 | 2.12 |
| 50% colour density | | | |
| Cyan | 0.76 | 0.87 | 0.81 |
| Magenta | 0.39 | 0.39 | 0.41 |
| Yellow | 0.55 | 0.56 | 0.57 |
| Black | 0.87 | 0.90 | 0.88 |
| Water-fastness | | | |
| Cyan | 98.90 | 96.30 | 98.10 |
| Magenta | 98.00 | 99.60 | 99.20 |
| Yellow | 99.10 | 98.60 | 98.50 |
| Black | 98.00 | 97.60 | 97.70 |
| Bleed | mark 4 | mark 3 | mark 2 |
| Dimensional stability | mark 8 | mark 7 | mark 7 |
| Field distance | 0.75 | 0.81 | 0.81 |

The Examples show that it was possible to achieve very good dimensional stability of the receiving material with high levels of colour density and good water-fastness and bleed properties.

What we claim is:

1. A recording material for the ink jet printing process, comprising a paper support and an ink absorbing layer containing a pigment and a binding agent wherein the paper contains a mixture of softwood sulphate and eucalyptus cellulose, and has a wet stretch in the transverse direction according to Fenchel<2.0%, a tearing length ratio longitudinal/transverse<2, a stiffness ratio longitudinal/transverse<2 and a density<0.7% g/cm$^3$, the proportion of softwood sulphate cellulose being between 10% and 40% by weight of the total cellulose.

2. A recording material according to claim 1, wherein the ink absorbing layer contains a polyvinyl alcohol with silanol groups and/or a polyvinyl alcohol with boric acid.

3. A recording material according to claim 1, wherein the ink absorbing layer contains a cationic polyacrylate.

4. A recording material according to claim 1, wherein the ink absorbing layer contains a cationic polyvinyl alcohol.

5. A recording material according to claim 2, wherein the polyvinyl alcohol with silanol groups is used in an amount of between 5% by wt and 20% by wt with respect to the absorbing layer, said absorbing layer being dry.

6. A recording material according to claim 2, wherein the polyvinyl alcohol with boric acid is used in an amount of between 5% by wt and 20% by wt with respect to the absorbing layer, said absorbing layer being dry.

7. A recording material according to claim 4, wherein the cationic polyvinyl alcohol is used in an amount of between 5% by wt and 20% by wt with respect to the absorbing layer, said absorbing layer being dry.

8. A recording material according to claim 3, wherein the cationic acrylate is used in an amount of between 2% by wt and 0% by wt with respect to the absorbing layer, said absorbing layer being dry.

9. A recording material according to claim 2, wherein the polyvinyl alcohol with silanol groups is used in an amount of between 10% by wt and 15% by wt with respect to the absorbing layer, said absorbing layer being dry.

10. A recording material according to claim 2, wherein the polyvinyl alcohol with boric acid is used in an amount of between 10% by wt and 15% by wt with respect to the absorbing layer, said absorbing layer being dry.

* * * * *